US008694691B2

(12) United States Patent  
Gole

(10) Patent No.: US 8,694,691 B2  
(45) Date of Patent: Apr. 8, 2014

(54) SYSTEMS AND METHODS FOR CREATING BIDIRECTIONAL COMMUNICATION CHANNELS USING BLOCK DEVICES

(71) Applicant: Marvell International Ltd., Hamilton (BM)

(72) Inventor: Abhijeet P. Gole, Cupertino, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 13/628,212

(22) Filed: Sep. 27, 2012

(65) Prior Publication Data

US 2013/0080664 A1    Mar. 28, 2013

Related U.S. Application Data

(60) Provisional application No. 61/540,157, filed on Sep. 28, 2011.

(51) Int. Cl.
   *G06F 13/10*    (2006.01)
(52) U.S. Cl.
   USPC .................................. 710/7; 710/62; 710/72
(58) Field of Classification Search
   None
   See application file for complete search history.

(56) References Cited

U.S. PATENT DOCUMENTS

| | | | |
|---|---|---|---|
| 6,574,755 B1* | 6/2003 | Seon | 714/56 |
| 6,986,083 B2* | 1/2006 | Gygi et al. | 714/719 |
| 7,934,023 B2* | 4/2011 | Basavaiah et al. | 710/5 |
| 8,065,430 B2* | 11/2011 | Murakami et al. | 709/235 |
| 8,135,918 B1* | 3/2012 | Yueh | 711/147 |
| 8,321,650 B2* | 11/2012 | Steinmetz et al. | 711/171 |
| 8,391,430 B2* | 3/2013 | Mihota | 375/350 |
| 8,411,677 B1* | 4/2013 | Colloff | 370/389 |
| 2006/0112220 A1 | 5/2006 | Otsuka et al. | |
| 2010/0161843 A1* | 6/2010 | Spry | 710/22 |
| 2011/0029730 A1* | 2/2011 | Durocher et al. | 711/114 |

OTHER PUBLICATIONS

Notification of Transmittal of The International Search Report and The Written Opinion of The International Searching Authority, or The Declaration dated Dec. 11, 2012 in reference to PCT/US2012/057540 (13 pgs).

* cited by examiner

*Primary Examiner* — Cheng-Yuan Tseng

(57) ABSTRACT

A system includes an initiator device including an initiator interface. A target device includes a target interface that communicates with the initiator interface via a protocol. The protocol supports commands being sent from the initiator device to the target device. The protocol does not support commands being sent from the target device to the initiator device. The target interface is configured to send a command to the initiator device via the protocol. The initiator interface is configured to execute the command.

22 Claims, 6 Drawing Sheets ly named inventors, to the extent the work
SYSTEMS AND METHODS FOR CREATING BIDIRECTIONAL COMMUNICATION CHANNELS USING BLOCK DEVICES

CROSS-REFERENCE TO RELATED APPLICATIONS

This application claims the benefit of U.S. Provisional Application No. 61/540,157, filed on Sep. 28, 2011. The disclosure of the above application is incorporated herein by reference in its entirety.

FIELD

The present disclosure relates to block device interfaces, and more particularly to systems and methods for creating bidirectional communication channels using block device interfaces.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A block device typically operates as a uni-directional device using a block device protocol. More particularly, an initiator device sends a command to a target device and the target device simply responds to the command. The block device protocol assumes that only the initiator device initiates the commands. For example only, a host computer may operate as the initiator device and a hard disk drive or a solid state drive may operate as a target device using a block device protocol. In this example, the block device protocol may include a small computer serial interface (SCSI). In contrast, hard disk drives and solid state drives may also operate as bi-directional, client-server devices when more sophisticated interfaces are used, such as a Peripheral Component Interconnect Express (PCIe) interface.

In the foregoing example, the initiator device typically sends commands to the target device using the block device protocol to read data from or write data to the hard disk drive or the solid state drive associated with the target device. The target device is not capable of sending commands back to the initiator device. However, the target device may be able to send status responses to the initiator device in response to the commands.

SUMMARY

A system includes an initiator device including an initiator interface. target device including a target interface that communicates with the initiator interface via a protocol. The protocol supports commands being sent from the initiator device to the target device. The protocol does not support commands being sent from the target device to the initiator device. The target interface is configured to send a command to the initiator device via the protocol. The initiator interface is configured to execute the command.

An initiator interface for an initiator device that communicates using a protocol includes a dispatcher module configured to generate a thread. The first thread sends a read command to read data at a predetermined storage location of a target interface of a target device via the protocol. The protocol supports commands being sent from the initiator device to the target device, and the protocol does not support commands being sent from the target device to the initiator device. An executor module is configured to generate an executor thread. When the dispatcher module receives data associated with the predetermined storage location of the target device, the dispatcher module is configured to treat the data as a command and forward the command to the executor module. The executor module is configured to execute the command.

A target device includes a target interface configured to communicate with an initiator device using a protocol and including a predetermined storage location. The target interface comprises a control device that is associated with the predetermined storage location of the target interface. The protocol supports commands being sent from the initiator device to the target device. The protocol does not support commands being sent from the target device to the initiator device. After receiving a read command for the predetermined storage location from the initiator device, the control device is thereafter enabled to selectively send a command to the initiator device. When the target device is ready to send the command to the initiator device, the control device is configured to send first data and second data to the initiator device. The first data identifies the command and the second data identifies the predetermined storage location.

A method includes using an initiator interface of an initiator device, communicating with a target interface of a target device via a protocol. The protocol supports commands being sent from the initiator device to the target device. The protocol does not support commands being sent from the target device to the initiator device. The method includes configuring the target interface to send a command back to the initiator device via the protocol and configuring the initiator interface to execute the command.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

In some applications using legacy devices, it is not possible to connect devices using a bi-directional interface such as a Peripheral Component Interconnect Express (PCIe) interface. For these applications, it may be desirable to have a target device send commands to an initiator device using a standard block device protocol. For example only, the target device may need to send a command to the initiator device to fetch data from another target device or to synchronize data with another target device.

Figure 1:
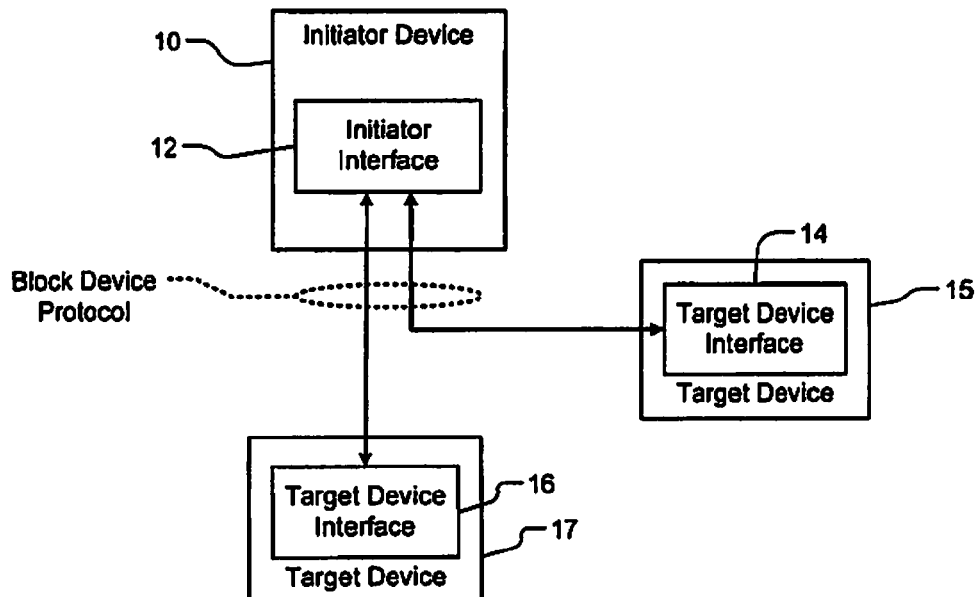
FIG. 1 is a functional block diagram of an example of an initiator device and one or more target devices communicating via a block device protocol according to the present disclosure.

Referring now to FIG. 1, an Initiator device 10 includes an initiator interface 12. A first target device 15 includes a first target interface 14 that communicates with the initiator interface 12 using a block device protocol. A second target device 17 includes a second target interface 16 that also communicates with the initiator interface 12 using the block device protocol.

Figure 2:
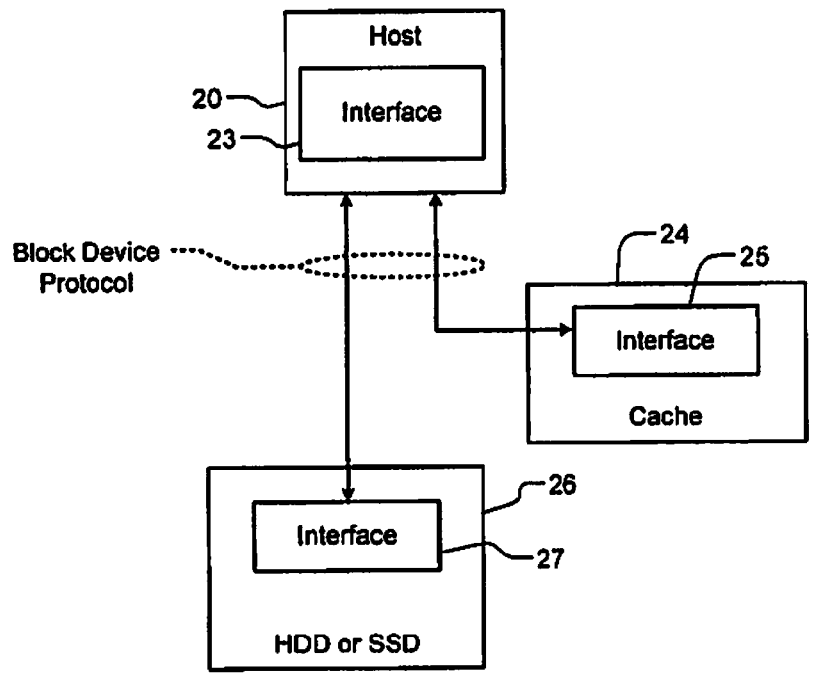
FIG. 2 is a functional block diagram of an example of a host device and one or more storage devices communicating via a block device protocol according to the present disclosure.

Referring now to FIG. 2, an example of the initiator device and the target device is shown. A host computer 20 includes an interface 23. A cache 24 includes an interface 25 that communicates with the interface 23 using the block device protocol. A storage device 26 such as a hard disk drive or solid state drive includes an interface 27 that communicates with the interface 23 using the block device protocol.

The cache 24 caches data stored on the storage device 26. In this situation, the interface 23 of the host computer 20 sends read/write commands and the cache 24 returns cached data. When a cache miss occurs, the interface 25 sends a "command" to the interface 23 using the block device protocol to fetch and return cache miss data from the storage device 26, as will be described further below.

The present disclosure describes systems and methods that enable commands to be sent from the first target device 15 to the initiator device 10 using the standard block device protocol. The mechanism employs one or more control devices that are created by the first target device. While the foregoing description describes systems and methods utilizing two control devices, a reverse communication of commands can be implemented with additional or fewer control devices.

Figure 3:
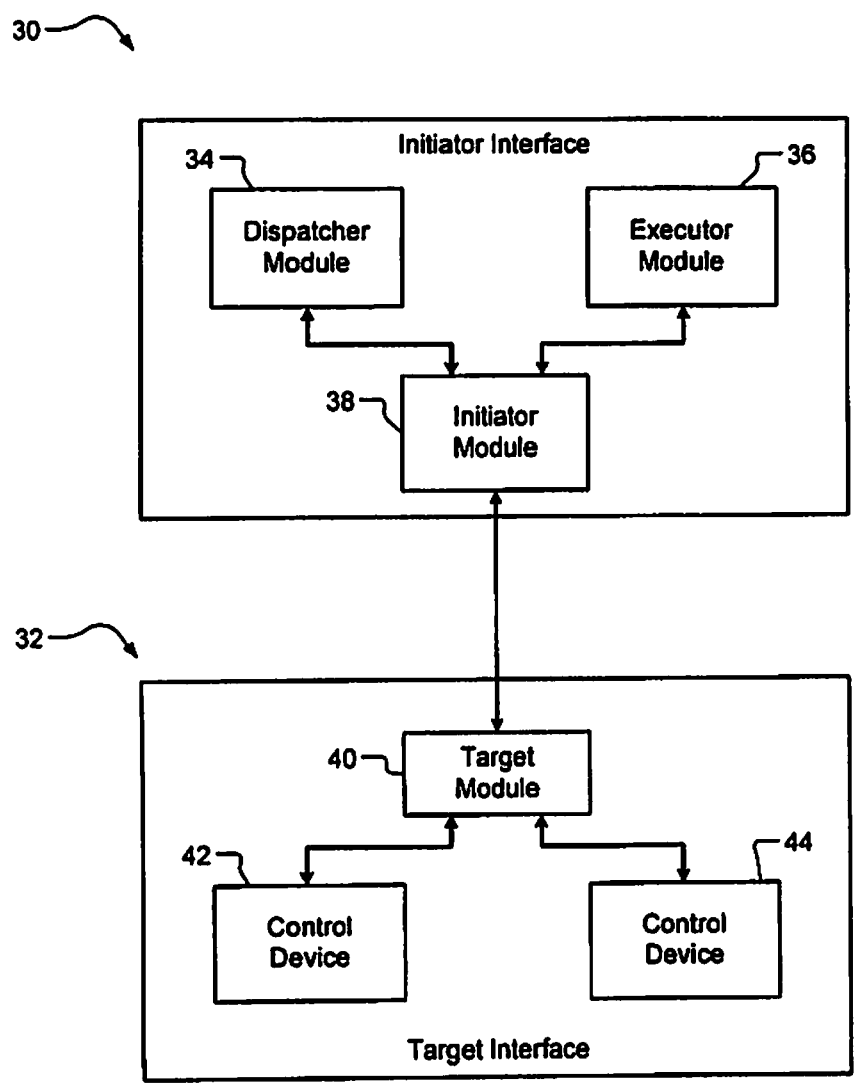
FIG. 3 is a functional block diagram of an example of an initiator interface and a target interface according to the present disclosure.

Referring now to FIG. 3, a host interface 30 includes a dispatcher module 34, an executor module 36 and an initiator module 38. The target interface 32 includes a target module 40, a first control device 42 and a second control device 44. The dispatcher module 34 generates a dispatcher thread that initiates commands. When a first command associated with a first predetermined storage location (Identified by a first address or a first address offset) of the first control device 42 is received (an open read command), the first control device 42 responds at that time or later (to close the open read command) with data (corresponding to a reverse command).

The dispatcher module 34 forwards the data/reverse command that is returned from the target interface to the executor module 36, which generates an executor thread to execute the command. The executor module 36 executes the command. In some examples, the executor module 36 may then send a second command and/or data to a second predetermined storage location (identified by a second address or second address offset) associated with the second control device 44. In this example, the first control device 42 is used as a device for delivering commands and control information in either direction. The second control device 44 is used to deliver data for operations initiated from the target interface 32.

More particularly, the dispatcher module 34 issues a read of a predetermined storage location (identified by the first address or the first address offset) of the first control device 42. The target interface 32 stores reverse direction commands in the first predetermined storage location associated with the first control device 42. The target interface 32 completes the read command when a read of the predetermined storage location occurs. When the read command completes, the dispatcher module 34 forwards the command to the executor module 36.

The executor module 36 executes the command. In some examples, executing the command may require fetching data from one or more remote targets and sending the fetched data to the target interface 32 by writing the data to the second predetermined storage location associated with the second control device 44. In some examples, the executor module 36 also writes a command completion status to the first control device 42 at a third predetermined storage location.

The target interface 32 does not need to have real storage media for the one or more control devices such as the first and second control devices. The first and second control devices 42 and 44 can be purely logical constructs or pseudo device structures implemented in firmware. For example only, suitable data structures for keeping track of commands and data passed back and forth using this communication mechanism include radix trees, B-trees or any data structure that efficiently keeps track of control or data pages read or written from/to different devices offsets.

Figure 4:
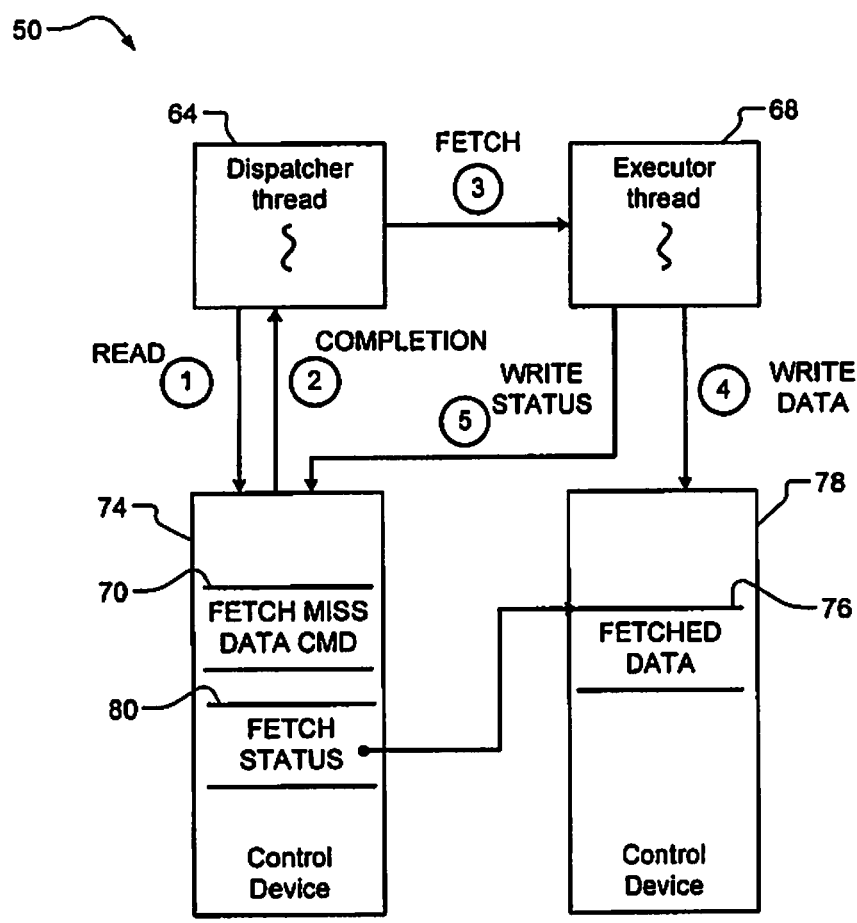
FIG. 4 is a functional block diagram of an example illustrating operation of the initiator interface and the target interface during a data fetch according to the present disclosure.

Referring now to FIG. 4, an example is shown to illustrate operation during a cache read. A dispatcher thread 64 sends an open read command to a first predetermined storage location at 70 of a first control device 74. Sometime later, the first control device 74 sends data/reverse command corresponding to a fetch miss data command. The dispatcher thread 64 receives the completed open read from the first predetermined storage location and therefore interprets the returned data as a reverse command. The dispatcher thread 64 forwards the reverse command to an executor thread 68, which executes the command (for example only, by fetching the data from one or more other target devices). The executor thread 68 writes the fetched data to a second predetermined storage location at 76 of a second control device 78. The executor thread 68 also updates a fetch status at a third predetermined storage location at 80 corresponding to the first control device 74.

Figure 5:
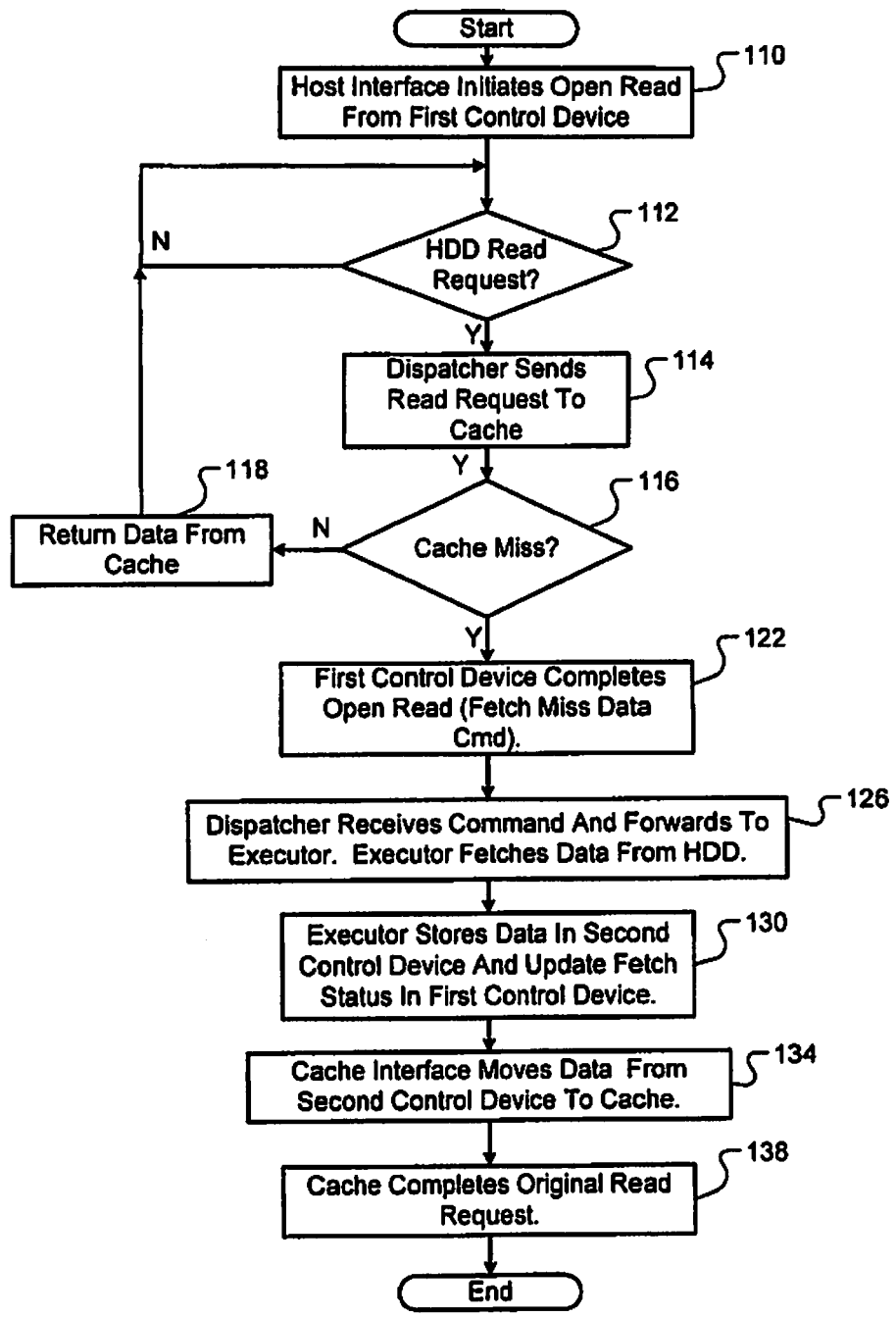
FIG. 5 is a flowchart illustrating an example of a method illustrating operation of the initiator interface and the target interface during a data fetch according to the present disclosure.

Referring now to FIG. 5, an example flowchart illustrating operation performed by a host interface, a cache target and a hard disk drive target during a cache read are shown. The host interface initiates an open read command from a first control device at 110. At 112, if there is a hard disk drive read request, a dispatcher module sends a read request to the cache at 114. At 116, the cache determines whether there is a cache miss. If not, the cache returns data at 118. If 116 is true, the first control device completes the open read command with a fetch miss data command at 122. At 126, the dispatcher module forwards the command to the executor module, which fetches data from the hard disk drive. At 130, the executor module stores the fetched data in the second control device and updates the fetch status in the first control device. At 134, the cache interface moves the data from the first control device to the cache. At 138, the cache completes the original read request.

Figure 6:
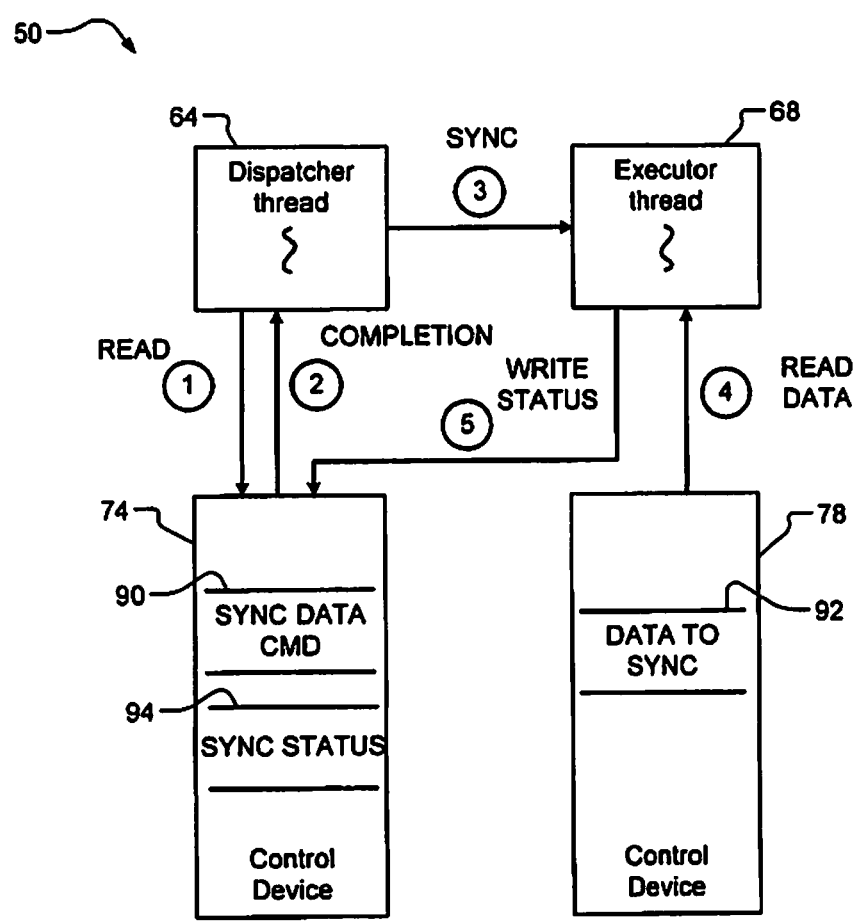
FIG. 6 is a functional block diagram of an example illustrating operation of the initiator interface and the target interface during a data sync according to the present disclosure.

Referring now to FIG. 6, an example of operation performed during a cache sync are shown. A dispatcher thread 64 sends an open read command to a first predetermined storage location at 90 corresponding to a first control device 74. Sometime later, the first control device 74 sends data/reverse command corresponding to a sync data command. The dispatcher thread 64 receives the completed read from the first predetermined storage location and therefore interprets returned data as a reverse command. The dispatcher thread 64 forwards the reverse command to an executor thread 68, which executes the command. The executor thread 68 reads the sync data from a second predetermined storage location at 92 corresponding to a second control device 78. The executor thread 68 syncs the data with one or more other target devices. The executor thread 68 also updates a sync status at a third predetermined storage location at 94 corresponding to the first control device 74.

Figure 7:
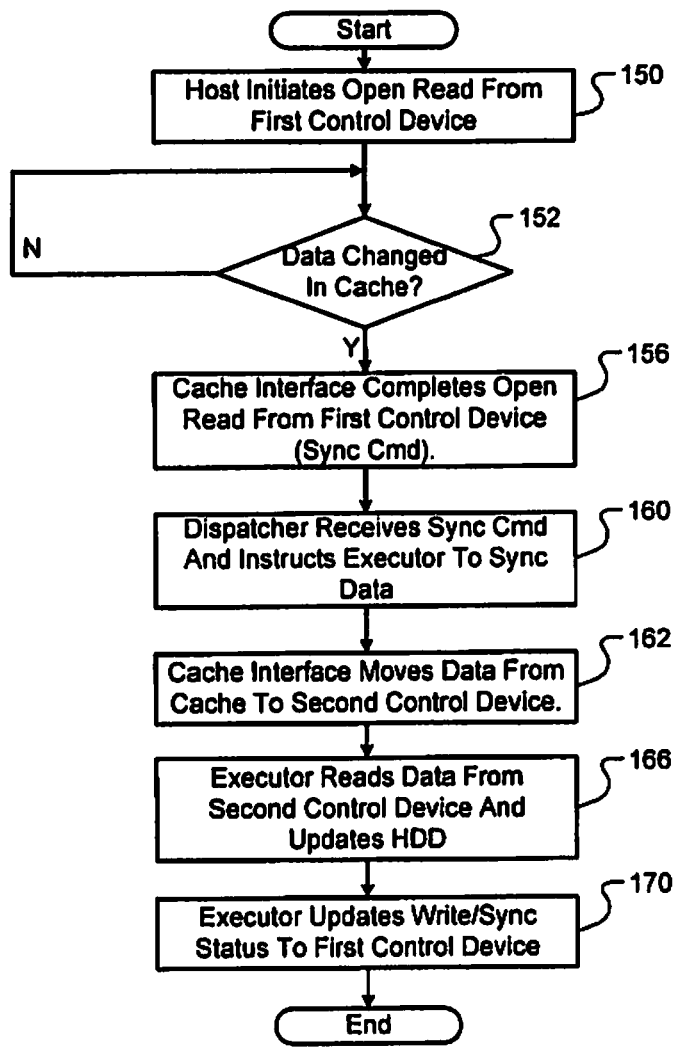
FIG. 7 is a flowchart illustrating an example of a method operating the initiator interface and the target interface during a data sync according to the present disclosure.

Referring now to FIG. 7, an example flowchart illustrating operation performed by a host interface, a cache target and a hard disk drive target during a cache sync are shown. The host interface outputs an open read command to a first control device at 150. At 152, the first control device determines whether data in the cache changed. If true, the first control device completes the open read command with a sync data command at 156. At 160, a dispatcher module receives a completed read command (corresponding to the open read command) from the predetermined storage location and forwards the sync command to the executor module. At 162, the cache interface moves data from the cache to a second predetermined storage location in a second control device. At 166, the executor module reads the sync data from the second control device and updates the hard disk drive. At 170, the executor module updates the write/sync status to the first control device.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A system comprising:
    an initiator device comprising an initiator interface; and
    a target device comprising a target interface that communicates with the initiator interface via a block device protocol, wherein
        the block device protocol supports data being sent from the initiator device to the target device and supports commands from a block device protocol command set being sent from the initiator device to the target device,
        the block device protocol supports data being sent from the target device to the initiator device but does not support commands from the block device protocol command set being sent from the target device to the initiator device,
        the initiator interface is configured to send a read command from the block device protocol command set to the target interface,
        the read command specifies a predetermined storage location of the target interface,
        the target interface is configured to respond to the read command by sending first data to the initiator device via the block device protocol, and
        the initiator interface is configured to
            receive the first data, and
            in response to the first data corresponding to the predetermined storage location, treat the first data as a first command and execute the first command.

2. The system of claim 1, wherein the initiator device includes:
    a dispatcher module configured to generate a thread, wherein the thread sends the read command to the target device via the block device protocol.

3. The system of claim 2, wherein the initiator device further includes:
    an executor module configured to generate an executor thread,
    wherein the dispatcher module is configured to receive the first data,
    wherein the dispatcher module is configured to, in response to the first data corresponding to the predetermined storage location, treat the first data as the first command and forward the first command to the executor module, and
    wherein the executor module is configured to execute the first command.

4. The system of claim 3, wherein the predetermined storage location comprises a first predetermined storage location and wherein the executor module is configured to, subsequent to executing the first command, selectively send second data to a second predetermined storage location of the target interface via the block device protocol.

5. The system of claim 4, wherein the executor module is configured to, subsequent to sending the second data to the second predetermined storage location of the target device, send third data to a third predetermined storage location of the target interface via the block device protocol.

6. The system of claim 5, wherein the third data comprises a command completion status.

7. The system of claim 1, wherein the target device is a first target device, the system further comprising:
a second target device,
wherein the first command is a fetch command to have the initiator device fetch data from the second target device.

8. The system of claim 7, wherein the initiator device is configured to, in response to the first command, send the fetched data to the first target device and send an update complete status to the first target device.

9. The system of claim 1, wherein the target device is a first target device, and further comprising:
a second target device,
wherein the first command is a sync command to sync data to the second target device.

10. The system of claim 9, wherein the initiator device is configured to, in response to the first command, send the sync data to the second target device and send a sync complete command to the first target device.

11. An initiator interface for an initiator device that communicates using a block device protocol, the initiator interface comprising:
a dispatcher module configured to generate a thread, wherein the thread sends a read command to read data at a predetermined storage location of a target interface of a target device via the block device protocol, wherein
the block device protocol supports data being sent from the initiator device to the target device and supports commands from a block device protocol command set being sent from the initiator device to the target device and, and
the block device protocol supports data being sent from the target device to the initiator device but does not support commands from the block device protocol command set being sent from the target device to the initiator device; and
an executor module configured to generate an executor thread, wherein
the dispatcher module is configured to, in response to receiving first data associated with the predetermined storage location of the target device, treat the first data as a first command and forward the first command to the executor module, and
the executor module is configured to execute the first command.

12. The initiator interface of claim 11, wherein the predetermined storage location comprises a first predetermined storage location and wherein the executor module is configured to, subsequent to executing the first command, send second data to a second predetermined storage location of the target interface via the block device protocol.

13. The initiator interface of claim 12, wherein the executor module is configured to, subsequent to sending the second data to the second predetermined storage location of the target device, send third data to a third predetermined storage location of the target interface via the block device protocol.

14. The initiator interface of claim 13, wherein the third data comprises a command completion status.

15. The initiator interface of claim 11, wherein:
the target device is a first target device, and
the first command includes one of:
a fetch command to fetch data from a second target device; and
a sync command to sync data to the second target device.

16. A target device, comprising:
a target interface configured to communicate with an initiator device using a block device protocol and including a predetermined storage location,
wherein the target interface comprises a control device that is associated with the predetermined storage location of the target interface,
wherein the block device protocol supports data being sent from the initiator device to the target device and supports commands from a block device protocol command set being sent from the initiator device to the target device,
wherein the block device protocol supports data being sent from the target device to the initiator device but does not support commands from the block device protocol command set being sent from the target device to the initiator device,
wherein the control device is configured to, in response to receiving a read command for the predetermined storage location from the initiator device, selectively (i) encode a first command as first data and (ii) send second data and the first data to the initiator device,
wherein the first data corresponds to the predetermined storage location and will be treated as the first command and executed by the initiator device, and
wherein the second data identifies the predetermined storage location.

17. The target device of claim 16, wherein the first command includes one of:
a fetch data command; and
a sync data command.

18. A method of operating a storage system including an initiator device and a target device, the method comprising:
communicating between the target device and the initiator device via a block device protocol, wherein
the block device protocol supports data being sent from the initiator device to the target device and supports commands from a block device protocol command set being sent from the initiator device to the target device, and
the block device protocol supports data being sent from the target device to the initiator device but does not support commands from the block device protocol command set being sent from the target device to the initiator device;
sending, from the initiator device to the target device, a read command from the block device protocol command set, wherein the read command specifies a predetermined storage location of the target device;
in response to the read command, sending first data back to the initiator device from the target device via the block device protocol;
at the initiator device, treating the first data as a first command; and
at the initiator device, executing the first command.

19. The method of claim 18, further comprising generating a thread, wherein the thread sends the read command to the target device via the block device protocol.

20. The method of claim 19, further comprising:
generating an executor thread; and
executing the first command using the executor thread.

21. The method of claim 18, wherein the predetermined location comprises a first predetermined storage location and further comprising, subsequent to executing the first command, sending second data from the initiator device to a second predetermined storage location of the target device via the block device protocol.

22. The method of claim 21, further comprising, subsequent to sending the second data to the second predetermined storage location of the target device, sending third data to a third predetermined storage location of the target device via the block device protocol, wherein the third data comprises a command completion status.

* * * * *